March 30, 1965     G. C. STABENOW     3,175,752
PACKAGE TEARING MEANS
Filed May 3, 1963
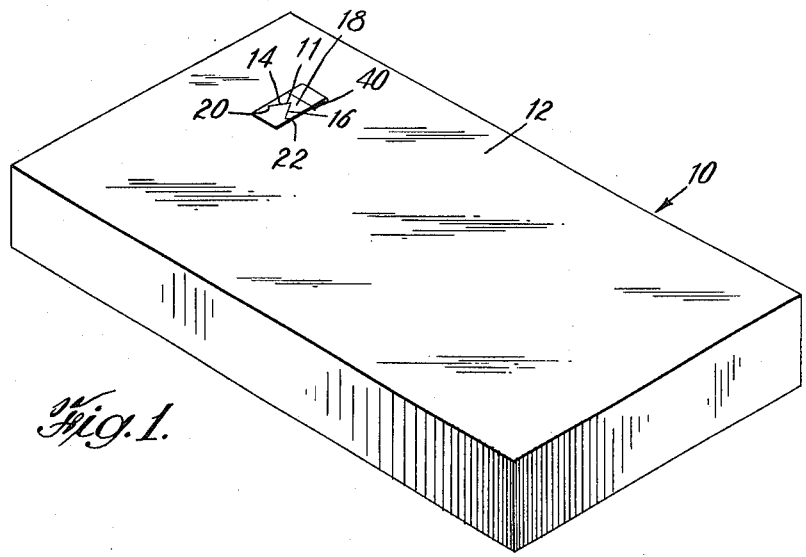
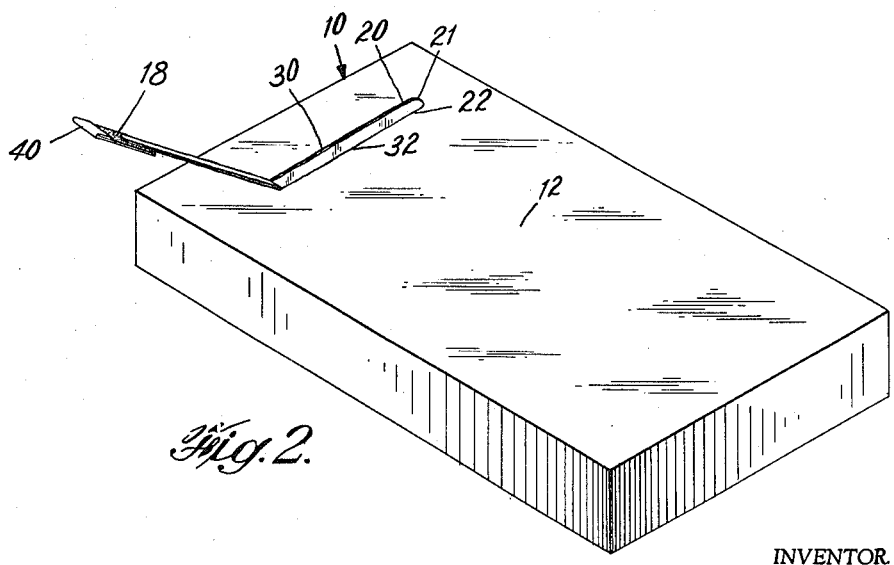
INVENTOR
GEORGE C. STABENOW
BY
*Walter C. Kehm*
ATTORNEY

United States Patent Office 3,175,752
Patented Mar. 30, 1965

3,175,752
PACKAGE TEARING MEANS
George C. Stabenow, Hinsdale, Ill., assignor to Union Carbide Corporation, a corporation of New York
Filed May 3, 1963, Ser. No. 277,819
9 Claims. (Cl. 229—51)

This invention relates generally to packaging and more particularly to the incorporation of a tearing means in a package in order to facilitate its being readily opened.

Interest in overwrap packaging with shrinkable films has grown rapidly particularly with the advent of axially oriented films such as polyethylene, polypropylene, poly(vinyl chloride), poly(vinylidene chloride), and the like biaxially oriented films. One of the outstanding features of shrinkable film overwrapping is the toughness of the package and its durability. While this is an asset, it obviously causes considerable difficulty in opening the package for removal of the contents inside. Overwrapped packages such as cigarette boxes are presently opened by means of a tear tape sealed onto the overwrapping film to initiate and maintain the tear in a directed manner. When pulled, the tear tape causes parting of the overwrap film along the length and over the area which is covered by the tape, thereby providing access to the packaged article. The high uninitiated tear resistance of axially oriented film overwrapping makes difficult the application of the foregoing type of tear tape means to axially oriented film overwrapping.

According to the present invention, a sheet of axially oriented film is provided with tearing means for readily producing a pair of extended, substantially parallel tears in the film. The tearing means comprises a cut having spaced opposing ends in the film and a strip of pressure sensitive tape overlying the cut in the film. The cut, such as an open ended V or U shaped cut provides a pair of initiated tears at the spaced, opposing ends of the cut so that pulling the pressure sensitive tape produces a pair of substantially parallel extended tears in the film. In the case of an open ended cut, the pressure sensitive tape is pulled in the direction of the open end of the cut.

It has now been found that while axially oriented films are tough and resist uninitiated tear, once initiated, a tear will readily continue in a substantially straight line along an axis of orientation, when a pulling force is exerted, thus enabling the width of the film being pulled to serve in essence as a tear strip.

While the use of a cut in a film to initiate a tear is applicable to axially oriented films in general, because of the tough, high uninitiated tear resistance of these films, the use of a cut is particularly applicable to axially oriented films which have been tightly shrunk about a package because of the further difficulty of initiating a tear arising from the tight fit between the film and the package.

The films which can be used in the present invention are any of those comprising one or more synthetic, organic thermoplastic polymers as long as they are orientable. Generally useful polymers are orientable polymers of olefins, e.g., monomers having the formula:

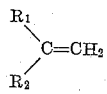

wherein $R_1$ is hydrogen or a halogen and $R_2$ is hydrogen, a halogen, or a hydrocarbon group such as an alkyl group or an aryl group, particularly those having from 1 to 8 carbon atoms, and copolymers thereof with one or more other compounds copolymerizable therewith which contain polymer producing unsaturation such as is present for example in carbon monoxide and in organic compounds containing the ethylene linkage $>C=C<$ e.g., styrene, vinyl stearate, butene, vinyl acetate, vinyl formate, methyl methacrylate, monobutyl maleate, 2-ethyl hexyl acrylate, N-methyl-N-vinyl acetamide, methacrylic acid, ethyl acrylate, acrylic acid, isoprene, butadiene, acrylamide, vinyl triethoxsilane, bicycloheptene, bicycloheptadiene, divinyl phosphonate and the like, as well as other types of polymers including polycarbonates and condensation products of equimolar amounts of dihydric phenols and mono and/or diepoxides, the polyhydroxyethers.

The term "shrinkable" as used herein refers to a property of a film by which it contracts in length and/or width, for example, upon exposure to sufficient heat. Shrinking is generally attributable to a reorientation of molecules which were previously oriented by stretching the film either uniaxially longitudinally (machine direction) or horizontally (transverse direction) or biaxially (both directions). The amount of shrinkability in the film is not critical. Obviously, the greater the shrinkability of the film the less taut the thermoplastic film must be pulled over the article to be wrapped and the farther from the edges of the article the seals can be. The absence of criticality in these operations effects great cost savings.

Other objects and advantages of the invention will be appreciated and the invention will be better understood from the following specification wherein the invention is described by reference to the particular embodiments illustrated in the acompanying drawings wherein:

FIGURE 1 is a perspective view of a wrapped article and shows the tearing means of the invention, and FIGURE 2 is a perspective view of a wrapped article and shows a modification of the present invention in a partly opened condition.

The package shown generally at 10 is wrapped with an axially oriented film 12. The film may be wrapped around the package which may have any desired configuration, and sealed by means of a heat sealer or other convenient means. Advantageously, the heat of the heat sealer may be employed to cause some shrinkage of the film about the package. Film shrinkage may be produced by any desired means such as brief exposure to heated air, as in an oven or by blowers or by dipping into a heated liquid such as boiling water. The shrinkage produces a tight, strong overwrap for the package. The shrinking of these type films is well known in the art and is seen for example, in United States Patent No. 2,477,614 to C.R. Irons.

The film can have a preformed configuration. The wrapping operation could thus consist of merely inserting the package into a bag-like member.

An initiated tear is made in the film, as shown in FIGURE 1, by making an open ended, V-shaped cut 11 in the film. The cut may be made by means of a knife, or heated bar or by any other suitable means to cut through the film. While the shape of the cut is not critical, the opposing ends 20 and 22 must be sufficiently far apart to enable the film to tear along two parallel lines for a desired distance. Tears in biaxially oriented, shrunk films tend to migrate to some degree and therefore the two tears initiated by the cut advantageously, are sufficiently offset so that they will not merge before the package can be opened to the desired extent.

While separation of about ⅛ of an inch could be adequate to open a package the size of a pack of cigarettes, a separation of at least ½ of an inch might be necessary to enable a 40 inch wide package to be opened. The migration of a tear is a characteristic of the particular material of the film and of the degree to which the material has been oriented. Therefore, the proper space between the pair of tears varies not only with package size, but also with film material and degree of orientation.

The fragility of the package and the tightness of the fit between the film and the package are important factors in determining the minimum length of the opening which must be produced by the tearing means. For example, a small opening produced in a film tightly wrapped around a plurality of eggs would not be adequate because attempts to further extend the small opening can result in breakage of an egg.

Premature tearing and/or spreading of cut 11 is prevented by means of the strip of pressure sensitive tape 18, which completely overlies the cut. Pressure sensitive tapes are well known in the art and are seen for example, in United States Patent No. 2,395,419. It has been found that a pressure sensitive tape which extends the full length of the desired tear, tends to limit tear migration during the opening operation and therefore is desirable in certain applications. The length of the opening produced by the tearing means can readily be further extended by employing a pressure sensitive tape which overlies a series of spaced cuts thus providing an arrangement in which subsequent pairs of parallel tears can be initiated in the film before preceding pairs of tears migrate and merge.

In order to provide for readily taking hold of the pressure sensitive tape and pulling it away from film 12, a tab 40 may be provided on the pressure sensitive tape 18. Tab 40 must be at or near the apex of the cut, and can be formed by folding over the end portion of the tape, or any other convenient means of forming an area in which the pressure sensitive adhesive is covered.

As seen in FIGURE 2, tab 40 is pulled in the direction of the open end of the open ended U-shaped cut 21 and thereby a pair of substantially parallel tears 30 and 32 are initiated at the opposing ends 20 and 22 of the cut.

In the case of open-ended cuts such as the V-shaped cut 11, of FIGURE 1 and the U-shaped cut 21 of FIGURE 2, the area enclosed by the cut and a straight line between the end points 20 and 22 of the cut serves as a contact zone between the cut portion of the film and the overlying pressure sensitive tape 18. The adhesion of the pressure sensitive tape to the film must be at least sufficient to enable a pull to be exerted which is greater than the tear resistance of the film. Therefore, the smaller the contact zone, the stronger the adhesive must be in order to provide adequate contact between the film 12 and the pressure sensitive tape 18 in the contact zone.

In the case of the straight line cut, the opposing end points of the cut correspond to the end points 20 and 22 of the open ended cuts 11 and 21. While a straight line cut does not provide an enclosed type of contact zone, if the adhesive of the pressure sensitive tape is of sufficient strength, the area of the film immediately adjacent the cut will function as an adequate contact zone and the pulling of the pressure sensitive tape in a direction perpendicular to the cut will produce a pair of parallel tears in the film 18.

The order of the steps of forming the tearing means is not critical with regard to the resultant tearing means. While the cut is preferably made in a shrinkable axially oriented film, covered by a pressure sensitive tape and then the film sealed and shrunk about a package, the cut can be made after the film is shunk about the package. Furthermore, when employing a pressure sensitive tape having a high initiated tear resistance, the cut may be made after the pressure sensitive tape is applied to the film, by cutting through both the film and the tape. The rigidity and tear resistance of the tape, in this case, serves to prevent tearing or spreading of the cut.

It should be noted that, if a film is used which exhibits extreme shrinkage and the tape and film are to be simultaneously subjected to the shrinking operation, then advantageously, a pressure sensitive tape is employed which is made of shrinkable material similar to that of the film in order to minimize distortion and wrinkling of the film and tape.

It is seen from the foregoing description that advantage is taken of the low initiated tear strength of axially oriented films and a tearing means is provided which is extremely simple in structure. The overwrap film serves as a tear tape, and therefore, no unsightly additional tear tape is necessary which can mar the package appearance.

The pressure sensitive tape can be clear to opaque or could have a color to match one or more of the colors of the package, and may be imprinted in any desired manner. It can, therefore, contain an advertising message, special pricing or the like, and thereby serve as a merchandising tool.

Although the invention has been described in its preferred forms with a certain degree of particularity, it is understood that the present disclosure of the preferred forms has been made only by way of example and that numerous changes in the details of construction and the combination and arrangements of parts may be resorted to without departing from the spirit and the scope of the invention as hereinafter claimed.

What is claimed is:

1. In a sheet of axially oriented film tearing means for readily producing a pair of extended substantially parallel tears in said film comprising, a cut having spaced opposing ends in said film and a strip of pressure sensitive tape overlying said cut whereby pulling of said pressure sensitive tape in a direction of axial orientation of the film produces a pair of parallel extended tears in said film.

2. The sheet of claim 1, wherein said film is shrinkable biaxially oriented thermoplastic material.

3. In a packaging means, sheet material of shrunk axially oriented thermoplastic film overwrapping said package, tearing means for opening said package comprising, a cut having spaced opposing ends in said film, and a strip of pressure sensitive tape overlying said cut whereby pulling of said pressure sensitive tape in a direction of axial orientation of the film produces a pair of parallel extended tears in said film.

4. The packagings of claim 3, wherein the cut has an open-ended shape and the pressure sensitive tape is pulled in the direction of the open end of said cut.

5. The sheet of claim 2, where the cut has an open ended shape and the pressure sensitive tape is pulled in the direction of the open end of said cut.

6. The sheet of claim 5, wherein said pressure sensitive tape includes, on the closed side of the cut, tab means for facilitating the pulling of said pressure sensitive tape.

7. The packaging means of claim 4, wherein said pressure sensitive tape includes, on the closed side of the cut, tab means for facilitating the pulling of said pressure sensitive tape.

8. The sheet of claim 6 wherein said tab means comprises an end portion of said pressure sensitive tape folded back upon itself thereby forming an area in which the pressure sensitive adhesive of said pressure sensitive tape is covered, whereby said pressure sensitive tape cannot adhere to said film in said area.

9. The packaging means of claim 7 wherein said tab means comprises an end portion of said pressure sensitive tape folded back upon itself thereby forming an area in which the pressure sensitive adhesive of said pressure sensitive tape is covered, whereby said pressure sensitive tape cannot adhere to said film in said area.

References Cited in the file of this patent

UNITED STATES PATENTS

| | | |
|---|---|---|
| 2,175,430 | Diamond | Oct. 10, 1939 |
| 2,554,137 | Burton | May 22, 1951 |
| 2,554,160 | Von Gunten | May 22, 1951 |
| 2,739,512 | Conti | Mar. 27, 1956 |
| 3,002,674 | Wright | Oct. 3, 1961 |
| 3,098,601 | Anderson et al. | July 23, 1963 |

FOREIGN PATENTS

| | | |
|---|---|---|
| 625,351 | Great Britain | June 27, 1949 |

Disclaimer

3,175,752.—*George C. Stabenow*, Hinsdale, Ill. PACKAGE TEARING MEANS. Patent dated Mar. 30, 1965. Disclaimer filed May 24, 1968, by the assignee, *Union Carbide Corporation*.

Hereby enters this disclaimer to all of the claims of said patent.
[*Official Gazette October 8, 1968.*]